(12) United States Patent
Kozak et al.

(10) Patent No.: US 12,014,850 B2
(45) Date of Patent: Jun. 18, 2024

(54) HIGH VOLTAGE POWER CABLE

(71) Applicant: Aptiv Technologies AG, Schaffhausen (CH)

(72) Inventors: Pawel Kozak, Cracow (PL); Grzegorz Paletko, Zabierzow (PL); Dominik Kawalec, Brzoskwinia (PL); Grzegorz Porębski, Podłęże (PL); Monika Pieszka-Lyson, Cracow (PL)

(73) Assignee: APTIV TECHNOLOGIES AG, Schaffhausen (CH)

( * ) Notice: Subject to any disclaimer, the term of this patent is extended or adjusted under 35 U.S.C. 154(b) by 0 days.

(21) Appl. No.: 17/962,922

(22) Filed: Oct. 10, 2022

(65) Prior Publication Data

US 2023/0115409 A1    Apr. 13, 2023

(30) Foreign Application Priority Data

Oct. 11, 2021 (EP) ..................................... 21201992
Oct. 6, 2022 (EP) ..................................... 22200059

(51) Int. Cl.
  *H01B 7/20* (2006.01)
  *H01B 7/42* (2006.01)

(52) U.S. Cl.
  CPC .................... *H01B 7/423* (2013.01)

(58) Field of Classification Search
  CPC ... H01B 7/20; H01B 7/30; H01B 7/34; H01B 7/42; H01B 7/421; H01B 7/423; H01B 4/28; H02K 5/22; H02K 7/20872; H02K 11/33; H02K 43/005
  USPC ...... 174/15.1, 15.2, 15.6, 17 LF, 21 R, 22 R, 174/47; 385/100, 103, 107, 113
  See application file for complete search history.

(56) References Cited

U.S. PATENT DOCUMENTS

| | | | | |
|---|---|---|---|---|
| 2,686,215 A | * | 8/1954 | Fondiller | H01B 7/29 62/223 |
| 5,902,958 A | * | 5/1999 | Haxton | H01B 7/0072 385/112 |
| 6,350,947 B1 | * | 2/2002 | Bertini | H01B 7/2813 174/47 |
| 6,713,673 B2 | * | 3/2004 | Kao | H01B 11/12 174/113 C |
| 10,029,575 B2 | * | 7/2018 | Remisch | H01R 13/005 |
| 2009/0178825 A1 | * | 7/2009 | Wu | H01B 7/425 174/113 R |
| 2013/0269966 A1 | * | 10/2013 | Emme | H01B 7/423 174/15.6 |
| 2020/0317070 A1 | * | 10/2020 | Fuhrer | H01B 9/02 |

(Continued)

FOREIGN PATENT DOCUMENTS

EP    3614402 A1    2/2020
EP    3651166 A1    5/2020

OTHER PUBLICATIONS

Extended European Search Report for Application No. 21201992.1, mailed Jun. 3, 2022., 11 pages.

(Continued)

*Primary Examiner* — William H. Mayo, III
(74) *Attorney, Agent, or Firm* — Billion & Armitage

(57) ABSTRACT

A high voltage power cable including an insulating body which incorporates a polymer. The insulating body defines an interior channel configured to receive a coolant. The high voltage power cable further includes an electrical conductor buried in the insulating body.

19 Claims, 5 Drawing Sheets

(56) References Cited

U.S. PATENT DOCUMENTS

2020/0361327 A1\* 11/2020 Heyne .................. H02J 7/0045
2021/0267097 A1    8/2021 Coppola et al.

OTHER PUBLICATIONS

Partial European Search Report for Application No. 21201992.1, mailed Mar. 2, 2022., 12 pages.

\* cited by examiner

HIGH VOLTAGE POWER CABLE

CROSS-REFERENCE TO RELATED APPLICATION

This application claims benefit of priority to European Patent Application No. 21201992.1 filed on Oct. 11, 2021, and European Patent Application No. 22200059.8 filed on Oct. 6, 2022, the entire disclosure of each of which is hereby incorporated by reference.

TECHNICAL FIELD

The present application relates in general to high voltage power cables, and more particularly, to a power cable configured for coupling to a cooling system, and a power distribution system incorporating an integrated cooling system.

BACKGROUND

Charging of high voltage batteries, for example in the field of automotive technology, requires the use of heavy gauge high voltage, HV, power cables that can conduct the level of current required to ensure fast charging. The HV power cables used in battery charging applications and/or power distribution applications are usually provided with a cooling system to ensure that heat generated by the electrical conductor due to the high current flow is dissipated, thereby increasing the efficiency and safety of the charging operation.

In one existing approach of the prior art, passive cooling solutions may be applied to reduce the temperature dissipated by a HV power cable. However, passive cooling solutions are limited due to manufacturing and weight constraints. For example, changing the dimensions of the components, e.g., increasing the electrical conductor gauges in order to reduce temperature increases the weight and cost of the power cable, while reducing its flexibility.

Typically, known power cables utilize one or more busbars to carry the electrical power and large heat sinks or air-cooling units designed to dissipate the heat generated during operation at the busbar.

Therefore, there is a need to provide a power cable capable of conducting high voltage and/or high current with a limited weight, a limited cost and a good flexibility. An object of the present disclosure is to improve the configuration.

SUMMARY

It is an aim of the present disclosure to provide an improved power cable and an improved power distribution system that addresses the problems described above.

The present disclosure concerns a power cable such as a high voltage power cable including:
 an insulating body including a polymer and defining an interior channel configured to receive a coolant, and
 an electrical conductor buried in the insulating body.

Thanks to the insulating body including an interior channel, a heat exchange area may be high and an efficient heat exchange may be obtained, for example with a coolant and/or with ambient air. This allows to reduce the temperature of the electrical conductor when a high-voltage power is transmitted through the electrical conductor.

Preferably, the interior channel is central with respect to the power cable. For example, the insulating body is all around the interior channel, except for the extremities, which may remain open.

Advantageously, the insulating body is overmolded on the electrical conductor. This allows an easy manufacturing process of the power cable.

Advantageously, the insulating body includes a peripheral wall around the interior channel, the peripheral wall having a thickness and the electrical conductor is located in a central portion of the thickness. This allows to obtain a robust but flexible power cable allowing an efficient heat exchange.

Preferably, the peripheral wall has an inner surface and an outer surface. The electrical conductor may be located closer to the inner surface than to the outer surface. This may allow increasing heat exchange when a coolant is used.

Advantageously, the insulating body is of a tubular or cylindrical form, which is more convenient to manufacture and to connect. The interior channel may have the same geometry.

Advantageously, the electrical conductor includes an electrical conductor layer to facilitate manufacturing and to increase heat exchange. The electrical conductor layer may be formed of a plurality of wires, for example all around the interior channel, i.e., in a whole circumference of the insulating body. The plurality of wires may be independent or interconnected, parallel to the longitudinal axis of the power cable or helicoidal with respect to this axis. The electrical conductor layer may have the same geometry as the insulating body, such as tubular or cylindrical. The wires forming the electrical conductor layer may be braided or meshed.

Advantageously, the power cable may have two electrical conductor layers or more. Preferably, these electrical conductor layers are concentric, for example with a central rotation axis shared with the interior channel. Several electrical conductor layers may allow to conduct higher current through the power cable while allowing an efficient cooling of the power cable through the interior channel.

Advantageously, the electrical conductor has first and second end contact surfaces including or defining exposed outer surfaces of the electrical conductor for coupling the electrical conductor to respective electrical terminals. For example, electrical connectors may be electrically connected to the first and second end surfaces and the respective electrical terminals.

Preferably, the several electrical layers may be insulated one from the other, in order to conduct a higher voltage level.

Advantageously, the electrical conductor is comprised of a metal material, the metal material including one or more of the following:
 copper,
 a copper alloy;
 aluminum, and/or
 an aluminum alloy.

Such metals allow a low resistance power conduction with reduced loss.

Advantageously, the electrical conductor is configured to transmit a high voltage of at least 1000 VAC root-mean-squared (RMS) and/or at least 1500 VDC.

Advantageously, the electrical conductor has a cross-section area of at least 10 mm$^2$, preferably at least 25 mm$^2$ and even more preferably at least 35 mm$^2$, which allows to transmit high voltage power with a reduced weight.

Advantageously, the insulating body has a thickness of at least 0.5 mm, preferably at least 1.0 mm, which allows a robust but flexible power cable with efficient heat exchange properties.

Advantageously, the insulating body includes at least one shielding layer around the electrical conductor, the shielding layer providing an electromagnetic shielding to the electrical conductor.

Advantageously, the high voltage power cable includes an overlay around the insulating body, the overlay including at least one shielding layer. The overlay may further protect the insulating body, in addition to the shielding function provided by the shielding layer.

A further aspect of the disclosure concerns a power cable such as a high voltage power cable including:
- an insulating body including a polymer and defining an interior channel configured to receive a coolant,
- an electrical conductor in the insulating body, and
- first and second end contact surfaces including or defining exposed outer surfaces of the electrical conductor for coupling the electrical conductor to respective electrical terminals.

A further aspect of the disclosure concerns a power cable such as a high voltage power cable including:
- a hollow insulating body including a polymer and defining a central interior channel configured to receive a coolant, and
- an electrical conductor in the insulating body.

All the advantageous or preferable features described above may apply to these aspects of the disclosure.

A further aspect of the disclosure concerns a power distribution system including:
- the high voltage power cable as described above, and
- at least two electrical connectors configured to electrically connect the electrical conductor to electrical terminals.

For example, the electrical connectors may be electrically connected to the first and second end contact surfaces or configured for such an electrical connection.

Advantageously, the at least two electrical connectors each include:
- a tubular or curved portion configured to contact one of the first and second end contact surfaces of the power cable, and
- a mounting portion that may extend transversally with respect to a longitudinal axis of the high voltage power cable and configured for an electrical connection with the electrical terminal.

Preferably, the mounting portion may have one or several grooves and/or holes in order to allow screwing to an electrical terminal. Alternatively, the mounting portion may be fixed to the electrical terminal by other fixing means.

Alternatively, at least one of the electrical connectors may have:
- Two tubular portions in fluid communication one with the other, one tubular portion to be connected to the power cable and the other tubular portion to be connected to a coolant tube, and
- A mounting portion fixed to and in electrical connection with the two tubular portions and configured for an electrical connection with the electrical terminal.

Advantageously, the power distribution system includes a cooling system to circulate the coolant in the interior channel of the insulating body, the cooling system including:
- a pump;
- a cooling unit configured to control the temperature of the coolant; and
- a cooling circuit for connecting the pump and the cooling unit to the interior channel of the high voltage power cable.

Preferably, the power distribution system includes a coolant, such as in the interior channel of the power cable and in the cooling system.

A further aspect of the disclosure concerns an electrical connector as described above.

A further aspect of the disclosure concerns the use of a high voltage power cable to transmit electrical power, having:
- an insulating body including a polymer and defining an inner channel configured to receive a coolant, and
- at least one electrical conductor in the insulating body.

The power cable according to this aspect of the disclosure may have all the advantageous or preferable features described above.

A further aspect of the disclosure concerns a method of transmitting electrical power including the steps of:
- Providing a high voltage power cable as described above,
- Introducing and/or circulating air or a coolant into the inner channel of the insulating body, and
- Transmitting electrical power in the at least one electrical conductor.

BRIEF DESCRIPTION OF THE DRAWINGS

The present invention is now described, by way of example with reference to the accompanying drawings, in which.

DETAILED DESCRIPTION

The high voltage electrical cable described herein is configured to transport electrical power in any kind of electrical, electronic or electromechanical system. In particular, the high voltage electrical cable is especially well suited to carry electrical power in transportation systems, in particular electrically powered transportation systems or hybrid power transportation systems i.e., including an electrical motor and an internal combustion engine, for example personal vehicles, professional vehicles, trucks, buses or specialized vehicles.

Figure 1:
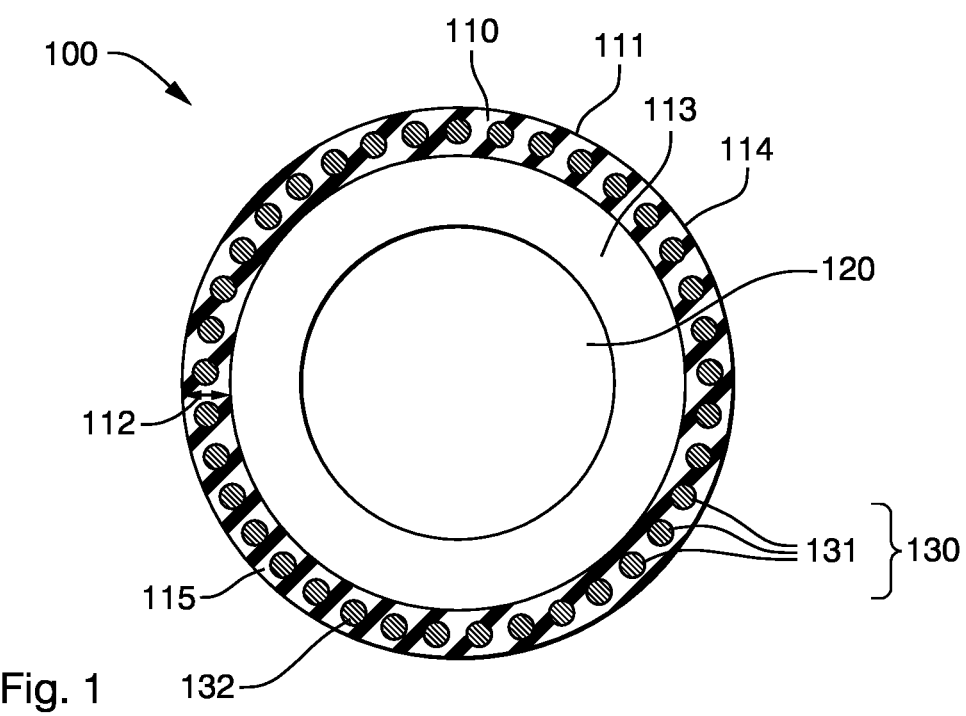
FIG. 1 shows a perspective view of a cross-section of a power cable according to an embodiment.

FIG. 1 shows a perspective view of a power cable 100 such as a high voltage power cable, including an insulating body 110 defining an interior channel 120. The insulating body 110 may comprise a peripheral wall 111 defining a thickness 112, an outer surface 114 and an inner surface 113. An electrical conductor 130 is incorporated or buried in the insulating body 110. The interior channel 120 is configured to receive a coolant and the electrical conductor 130 is configured to conduct electrical power.

The insulating body 110 may have a first end portion 115 showing a first end contact surface 132 of the electrical conductor 130 and defining an opening to the interior channel 120, as visible in FIG. 1. The first end contact surface 132 may be perpendicular to the longitudinal axis of the high voltage power cable 100 and may expose part of the electrical conductor 130 to allow electrical connection, as shown in FIG. 1. For example, the first end portion 115 may be obtained by cutting the power cable.

Figure 4:
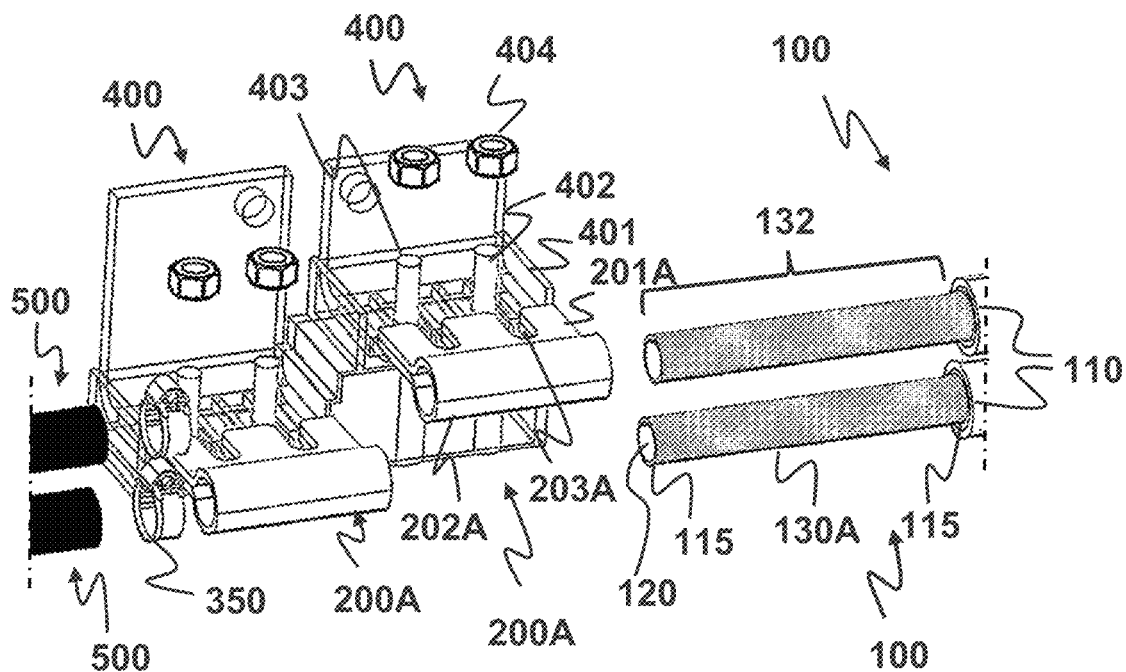
FIGS. 4 and 5 show a perspective view of two power cables connected to electrical terminals according to an embodiment.

Alternatively, or in combination, the first end contact surface 132 may be obtained by removing the exterior thickness of the insulating body 110 i.e., the portion of the insulating body 110 between the electrical conductor 130 and the outer surface 114, thus revealing an outer surface of the electrical conductor 130, as visible in FIG. 4.

Figure 3:
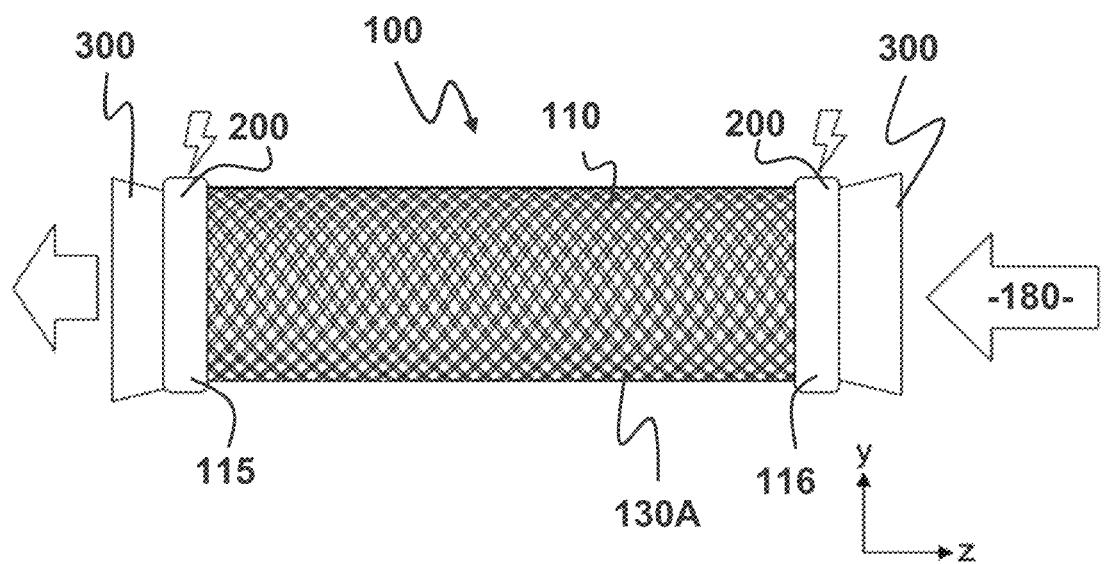
FIG. 3 shows a lateral view of a schematic power cable according to an embodiment.

Opposite to the first end portion 115 is a second end portion 116 that may be identical, similar or different than the first end portion (not visible in FIG. 1 but shown in FIG. 3). Both first and second end portions 115, 116 may provide access to the interior channel 120. The first and/or second end portions 115, 116, may define a flat, beveled or stepped surface of the insulating body 110.

Thanks to the specific geometry of the high voltage power cable 100, in particular the location of the electrical conductor 130 in the thickness of the insulating body, an efficient cooling may be achieved while conducting power.

In particular, the outer surface 114 may allow heat exchange with the outer environment and the inner surface 113 may allow heat exchange with the interior channel 120. Because heat exchange may be performed on two opposite surfaces of the insulating body 110, heat exchange can be high, and a high voltage may be conducted by the electrical conductor 130 without increasing weight or reducing flexibility of the power cable 100.

Further, the first and second end portions 115, 116 of the insulating body 110 may be connected to a cooling unit through a cooling circuit that may include fluid connectors 300 and configured to circulate a coolant 180 inside the interior channel 120. Consequently, heat exchange through the inner surface 113 may be increased, which allows to conduct a higher voltage while avoiding high temperature and/or heavy weight.

The insulating body 110 may be made of any insulating material. Preferably, the insulating body is flexible, i.e., it may be bent around a radius. The insulating body 110 may be made of a polymeric material and may have some elastic properties. For example, the insulating body may be made of one or several of cross-linked polyethylene XLPE, polypropylene PP, polyamide PA, ethylene tetrafluoroethylene ETFE and fluorinated ethylene propylene FEP. Any filler, additive, pigment or colorant may be incorporated into the insulating body 110, as known in the art. The insulating body 110 is preferably a single layer.

The insulating body 110 may have any geometry or cross-section, for example circular, oval, square or rectangular. The electrical conductor 130 may be incorporated in the bulk of the insulating body material, for example by overmolding, which simplifies the manufacturing process of the high voltage power cable and increases heat transfer through conduction inside the material of the insulating body 110. For example, the insulating body 110 is made of solid material without any free space or recess.

The electrical conductor 130 may include at least one strand or wire 131 and preferably a plurality of wires such as at least two wires and more preferably several wires. For example, the wires may be located in a central portion of the insulating body thickness. i.e., between the outer surface 114 and the inner surface 113. Alternatively, the wires may be closer to the inner surface 113 than to the outer surface 114, in particular if a coolant is present in the interior channel 120, to increase heat transfer.

In addition, the wires 131 may be located at regular intervals in the cross section of the insulating body 110, as visible in FIG. 1, so as to form an electrical conductor layer. The electrical conductor layer is preferably located all around the interior channel 120 except the extremities. The longitudinal axis of the wires may be parallel to the longitudinal axis of the high voltage power cable (see FIG. 3), or the wires may be helicoidal around the longitudinal axis of the power cable 100 (see FIG. 7).

Preferably, the wires 131 may be interconnected, i.e., in electrical connection with each other. For example, the interconnected wires may be braided (130A, see FIGS. 3-5) or in the form of a mesh (130B, see FIG. 6). For example, the braided electrical conductor layer may be slack as visible in FIG. 3, with significant spaces between the wires 131, which may be filled by the material of the insulating body 110.

Figure 5:
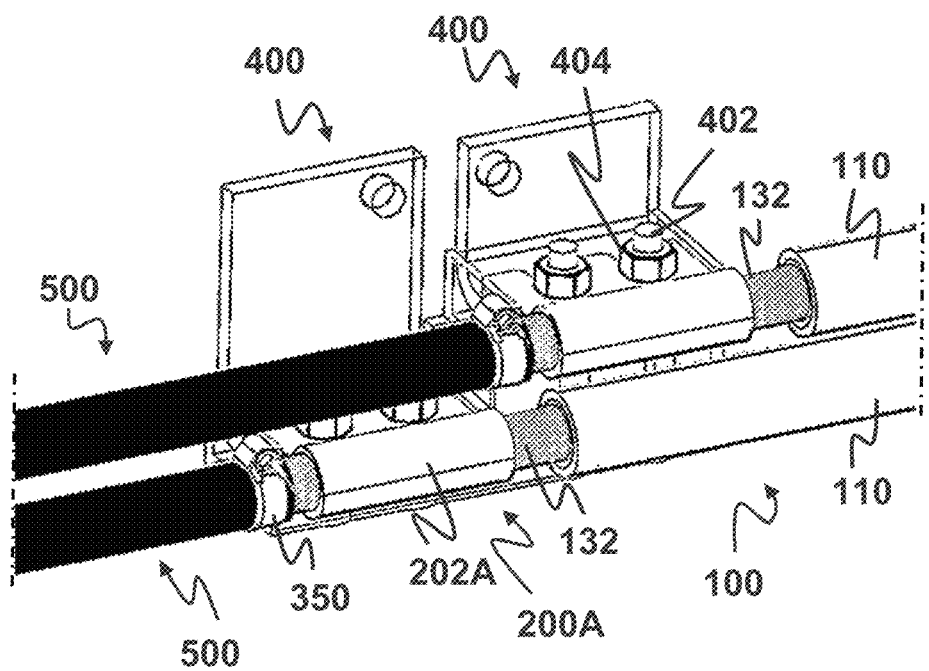

The wires 131 of the braided electrical conductor may also be tightly bound, as visible in FIGS. 4 and 5, with small spaces or no spaces between the wires 131. Such an electrical conductor layer may increase the voltage and/or current that may be conducted by the wire and optimize cooling by enhancing conduction with the insulating body material. It may also improve the mechanical resistance of the power cable 100.

The electrical conductor may include more than one electrical conductor layer, for example two or three electrical conductor layers. The electrical layers may be concentric and centered on the longitudinal axis of the power cable 100. The more than one electrical conductor layers may or may not be electrically connected with each other.

The insulating body 110 may include shielding in the insulating body or preferably outside the insulating body. Preferably, shielding may include one or several layers of braided single strands of metal material, of a metal tape for example wrapped helically with spaces or overlapping, or applied longitudinally, a metal braided closed sleeve, a solid profile and/or a metal braided open sleeve. For example, the metal material of the shielding may include aluminum and/or copper and their alloys. The shielding layer(s) may be similar or identical to the electrical conductor layer, although not connectable. Preferably, the thickness of the shielding layer(s) is reduced with regard to the electrical conductor layer.

The shielding layer(s) may be included in the insulating body 110 and/or in an overlay provided around the insulating body 110. The overlay may be made from the same or a similar material to the one of the insulating body 110. The overlay is preferably a single layer and may be glued, fused or melted to the insulating body 110.

Figure 2:
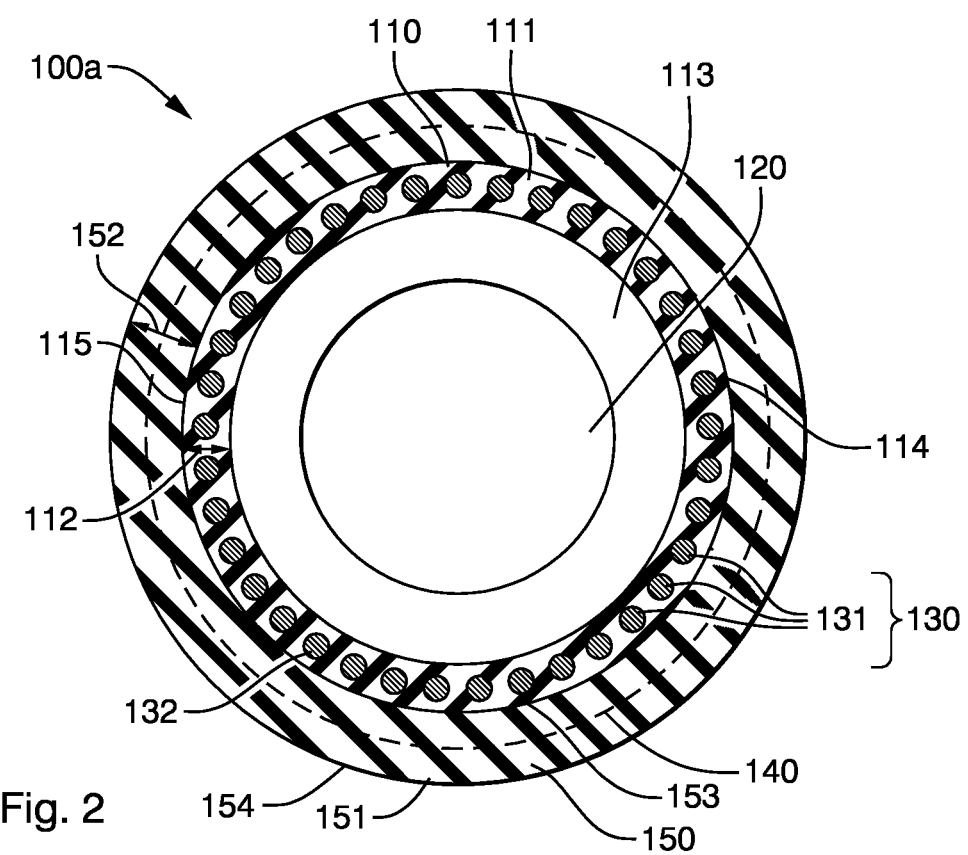
FIG. 2 shows a perspective view of a cross-section of a power cable according to an embodiment.

For example, FIG. 2 shows a perspective view of a power cable 100a identical to the power cable 100, with the addition of a shielding layer 140 included in an overlay 150 or insulation layer. This overlay 150 defines an additional peripheral wall 151 and an additional thickness 152. The inner surface 153 of the additional peripheral wall 151 may be in contact, glued or melted with the outer surface 114 of the insulating body 110. The additional peripheral wall 151 may further include an outer surface 154 facing an outer environment. The additional peripheral wall 151 has the function of including the shielding layer 140 and may also provide an additional mechanical and electrical insulation to the insulating body 110 and the electrical conductor 130.

The wires 131 of the electrical conductor may have any configured cross-section. For example, the cross-section of the wires may be circular, such as a visible in FIGS. 1 and 2, but also oval, square or rectangular. Preferably, the area of the cross-section of the electrical conductor is at least 10 mm², preferably at least 20 mm², more preferably at least 25 mm² and most preferably at least 35 mm². The material of the electrical conductor may be any electrical conducting material, such as copper, aluminum and their alloys.

The thickness 112 of the insulating body 110, i.e., the distance between the outer surface 114 and the inner surface 113 is at least 0.5 mm and preferably at least 1.0 mm. The thickness of the insulating body 110 and/or the cross-section area of the electrical conductor may be chosen preferably in accordance with the voltage and/or current to be conducted in the power cable. For example, the power cable may be configured to conduct a high voltage, i.e., at least 1000 V AC (RMS) and/or at least 1500 V DC. However, the power cable 100 may also carry medium or low voltage, according to the needs.

FIG. 3 shows an example of a high voltage power cable 100 with a braided electrical conductor 130A forming an electrical conductor layer. The insulating body 110 may be made of a transparent polymeric material allowing to see the electrical conductor layer. In the set-up of FIG. 3, first and second electrical connectors 200 are mounted on the first and second end portions 115, 116 of the power cable 100 and are electrically connected to the first end contact surface 132 and the second end contact surface (not visible in FIG. 3).

For example, one of the electrical connectors 200 may be connected to an electrical terminal of a power source and the other electrical connection may be connected to an electrical terminal of a power consumption device (not shown in FIG. 3). In addition, the first and second end portions 115, 116 of the power cable 100 may be provided with fluid connectors 300 allowing to fluidly connect the interior channel 120 with a cooling circuit and a cooling unit.

FIGS. 4 and 5 represent another example of two high voltage power cables 100 in a particular set-up, connected to two electrical connectors 200A and to coolant tubes 500 In FIGS. 4 and 5, the power cables 100 are identical but different power cables may be used in the same electrical circuit. The first end portions 115 of both power cables 100 have been prepared by removing the external thickness of the insulating body 110 in order to reveal the first end contact surfaces 132 of the electrical conductors 130A, in particular an outer surface of the electrical conductors 130A.

The internal thickness of the insulating body 110 is still present, between the electrical conductor 130A and the inner surface 113, in order to ensure sealing of the interior channel 120 and to prevent any leak of coolant. Consequently, the first end portions 115 of the power cables 100 may define a stepped profile, with a decreased thickness of the insulating body 110 revealing at least an outer surface of the electrical conductor 130.

Two electrical connectors 200A are configured to receive the first end contact surfaces 132 of the power cables 100. These electrical connectors 200A may have a tubular portion 202A and a mounting portion 201A, for example extending radially from the tubular portion 202A. The tubular portion 202A may have an inner diameter substantially equal to the outer diameter of the electrical conductor 130, or slightly larger, to allow an assembly of the end contact surface 132 into the tubular portion 202A.

The mounting portions 201A may be planar and may each have two grooves 203A, for example extending in the radial direction with respect to the tubular portion 202A, in FIGS. 4 and 5. The mounting portions 201A may be fixed on a seat 401 of an electrical terminal 400 connected to an electrical device. The seat 401 may include an optional peripheral wall 402 and two shafts 403. Each shaft 403 may have a threaded portion and may receive a nut 404, in order to fix the mounting portion 201A to the seat 401.

Consequently, each electrical connector 200A allows an electrical connection of the electrical conductor 130A of one of the power cables 100 with the electrical terminal 400 but may also allow to attach or secure the first end portion 115 of the power cable 100. The electrical terminals 400 may have only one shaft, two shafts or more than two shafts. The number of grooves 203A may be equal to or greater than the number of shafts 403. As an alternative to the grooves 203A, openings or through holes may be provided in the mounting portions 201A.

In addition, the first end portion 115 may be fluidly connected to a coolant tube 500. For example, the internal diameter of the coolant tube 500 may be substantially equal to or slightly smaller than the exterior diameter of the electrical conductor 130. The coolant tube 500 may be made of an elastomeric material, preferably. A portion of the first end contact surface 132 may thus be accommodated and preferably tightly sealed in the coolant tube 500, thus allowing a fluid connection with the interior channel 120. Preferably, clamping rings 350 may secure the coolant tube 500 to the power cable 100.

A casing may be provided to cover at least the electrical connector 200/200A and the first end contact surface 132 (not shown) and preferably at least a part of the electrical terminal 400. For example, the casing may protect the electrical connector, the first end portion 115 and the electrical conductor 130 from dust, water or contact with other elements of a vehicle. It may also prevent electric shock during maintenance and/or may contribute to attaching the power cable 100, for example with respect to the electrical terminal 400 or with respect to a body of the vehicle.

Figure 6:
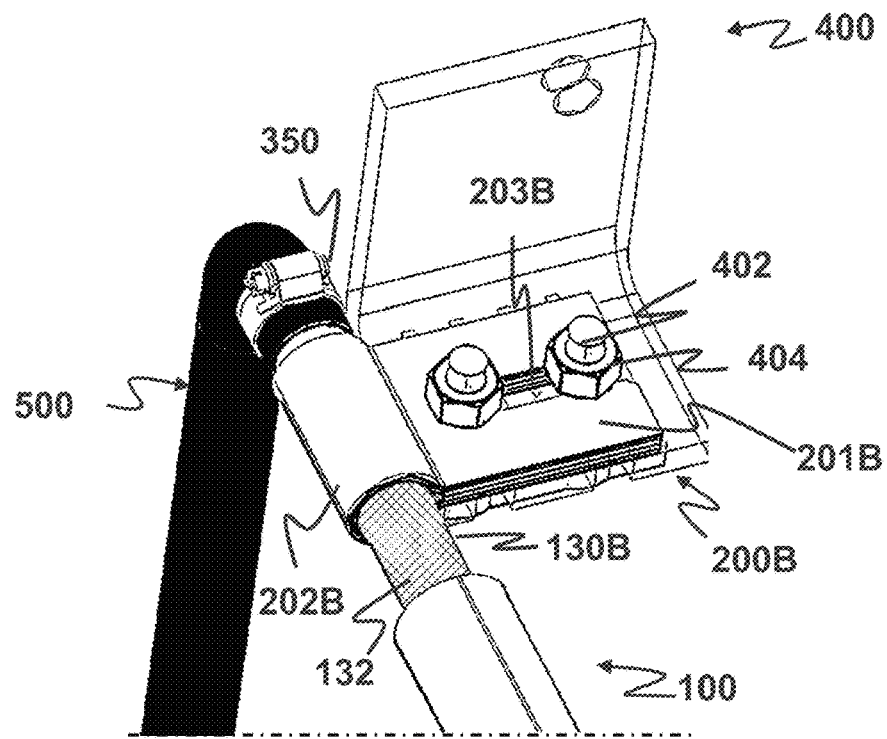
FIG. 6 shows a perspective view of a power cable connected to an electrical terminal according to an embodiment.

FIG. 6 shows another example of a connection of a power cable 100 to an electrical terminal 400 thanks to an electrical connector 200B. The electrical connector 200B may have a mounting portion 201B including a single groove 203B accommodating both shafts 403. The tubular portion 202B may be similar to the tubular portion 202A of FIGS. 4 and 5.

In FIG. 6, the electrical conductor 130B is represented in the form of a mesh but may be of any other form. In addition, the coolant tube 500 has a bend in FIG. 6 but may also be straight, like the previous figures. All other features may be similar to FIGS. 4 and 5. Such an electrical connector may be advantageous for an electrical connection in a limited space, for example in a small size vehicle.

Figure 7:
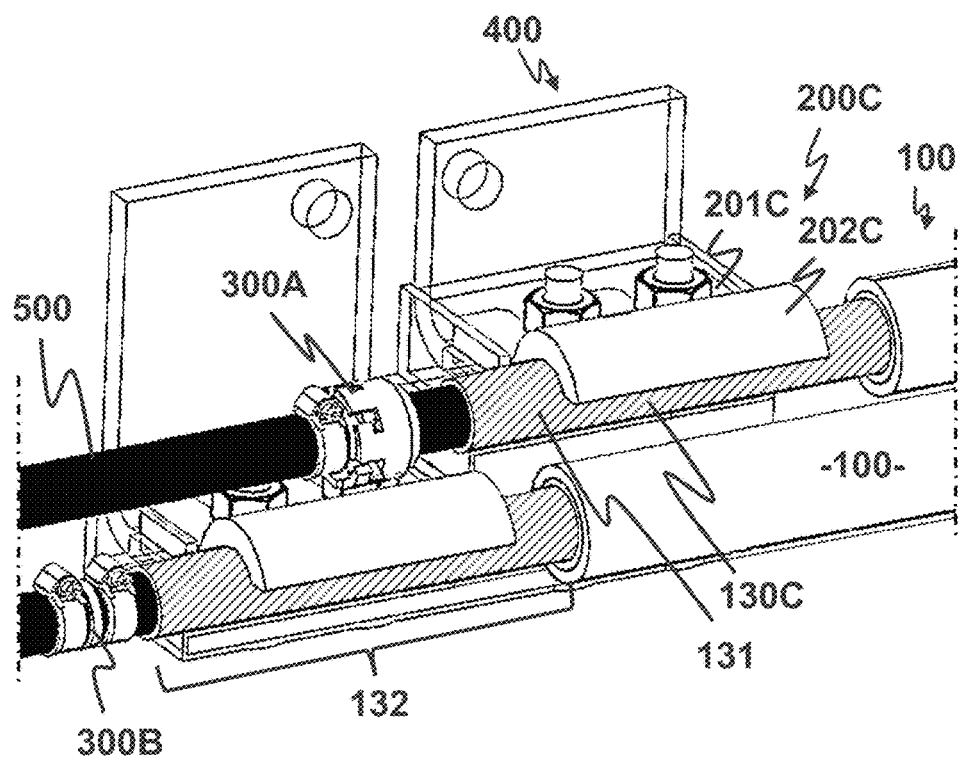
FIG. 7 shows a perspective view of a power cable connected to electrical terminals according to an embodiment.

FIG. 7 shows another example of an electrical connector 200C. The electrical connector 200C includes a mounting portion 201C that may be identical to the mounting portion 201A and a curved portion 202C in lieu of the tubular portion 202A/202B of the previous examples. All the other features may be identical to the FIGS. 4 and 5.

As visible in FIG. 7, the curved portion 202C may be a half circle, i.e., 180° of the tubular portion 202A, or at least 120° and at most 210°. The curved portion 202C is located on top of the first end contact surface 132 but may also be located below the first end contact surface 132. The electrical conductor 130C may be formed of helicoidal wires 131 or may be in any other form.

The curved portion 202C may be welded, soldered or brazed to the electrical conductor 130C, or a casing (not shown) may be configured to the electrical conductor 130C and the first end contact surface 132 in order to maintain an electrical contact between the electrical conductor 130C and the electrical connector 200C. For example, the casing may secure the power cable 100 with respect to the electrical connector 200C and/or the electrical terminal 400.

FIG. 7 further includes two examples of two fluid connectors 300A and 300B. The fluid connector 300A may be formed of a male portion and a female portion and include one or several O-rings to ensure sealing. For example, the male portion and the female portion may be locked one with the other by a limited rotating movement. The male portion may be attached to the first end contact surface 132 or to a portion of the first end portion 115 of the insulating body 110 without electrical conductor 130. The female portion may be attached to the coolant tube 500, or alternatively to the first end portion 115.

The fluid connector 300B may include a tube provided with a first portion inserted in the interior channel 120 of the power cable 100 and a second portion inserted in the coolant tube 500. An edge portion may be located between the first portion and the second portion of the fluid connector 300B. Two clamping rings 350 may be provided in order to secure the coolant tube 500 and the power cable 100 to the fluid connector 300B.

Figure 8:
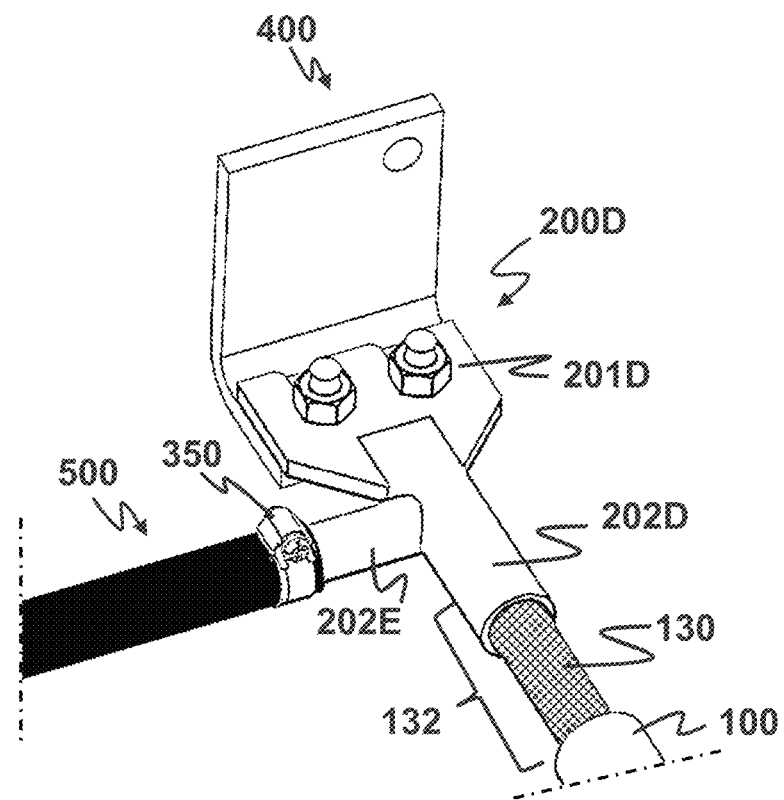
FIG. 8 shows a perspective view of a power cable connected to an electrical terminal according to an embodiment.

FIG. 8 shows another example of an electrical connector 200D. The electrical connector 200D includes a mounting portion 201D, close to the mounting portion 201A and which may include a triangular portion configured to extend further from the electrical terminal 400. In addition, the electrical connector 200D may include a first tubular portion 202D and a second tubular portion 202E. All the other features may be similar to the above description.

The first tubular portion 202D may be configured to form an angle with the second tubular portion 202E. For example, a longitudinal axis of the first tubular portion 202D may form an angle with a longitudinal axis of the second tubular portion 202E, for example of 70° to 130°, preferably 80° to 100°, most preferably 90°. The mounting portion 201D may be joined to the first tubular portion 202D and/or the second tubular portion 202E for example by welding, braising, screwing, snap fitting. Alternatively, the mounting portion 201D, the first tubular portion 202D and/or the second tubular portion 202E may be formed as a single piece, for example by additive manufacturing.

The first tubular portion 202D may be located longitudinally with respect to the mounting portion 201D, and/or may only include a single outside opening opposite to the mounting portion 201D. The first tubular portion 202D may be configured to receive at least part of the first end contact surface 132 of the power cable 100, so that the internal surface of the first tubular portion 202D may be in contact with the external surface of the electrical conductor 130, similarly to the electrical connectors 200A and 200B.

The second tubular portion 202E may be located transversally with respect to the mounting portion 201D. The second tubular portion 202E may be fluidly connected with the first tubular portion 202D, for example through an inside opening of the first tubular portion 202D, to allow a flow of coolant. A coolant tube 500 may be plugged into the second tubular portion 202E and secured by a clamping ring 350, as previously described. The electrical connector 200D may be configured to electrically connect large electrical elements, for example a vehicle battery.

Although the first tubular portion 202D, the second tubular portion 202E and the mounting portion 201D are in the same plane in FIG. 8, they could also be located in different planes, i.e., from several angles, in order to adapt to a limited or bulky space. All the other elements relating to the electrical terminal 400 or to attaching the electrical connector 200D to the electrical terminal 400 may be identical or similar to the other examples. The location of the first tubular portion 202D and the second tubular portion 202E with respect to the mounting portion 201D may be inverted.

Figure 9:
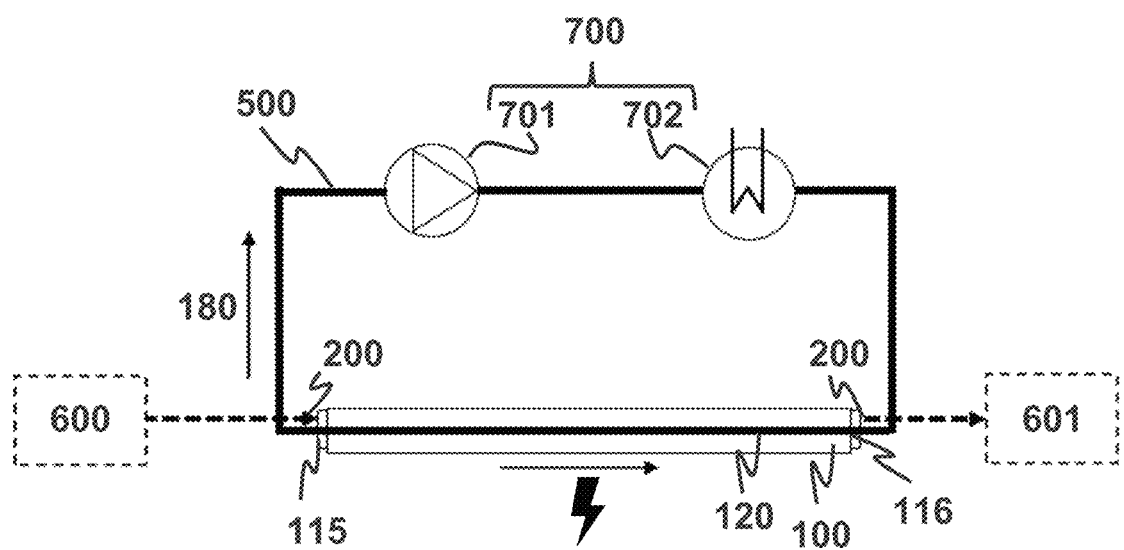
FIG. 9 is a block diagram illustrating a power distribution system including a power cable and a cooling system according to an embodiment.

FIG. 9 shows a schematic view of a power distribution system including the power cable 100 connecting a power source 600 such as a power storage device or a power production device to a power consumption device 601, through respective electrical connectors 200 mounted on first end portion 115 and second end portion 116. The interior channel 120 of the power cable 100 is in fluid communication with a cooling unit 702 via a cooling circuit.

The cooling circuit may include tubing such as coolant tubes 500, fluid connectors 300 and/or clamping rings 350 and may fluidly connect the power cable 100 to a pump 701 configured to circulate coolant 180 and a cooling unit 702 configured to cool the coolant 180. The pump 701 and the cooling unit 702 may define a cooling system 700. The cooling circuit may be part of the cooling system 700.

For example, the cooling unit 702 may receive a cooling fluid from a cold production unit or a refrigeration unit. Such a refrigeration unit may cool the cooling fluid through any known means such as vapor-compression cycle, sorption cycle, gas cycle, thermoelectric refrigeration, magnetic refrigeration or other method. For example, the refrigeration unit may be an auxiliary system of a secondary battery and/or part of the vehicle air-conditioning system. Alternatively, the cooling unit 702 may be a passive air-liquid exchanger, for example located in an exposed part of the vehicle.

Thanks to the coolant circulating in the interior channel 120, an efficient heat exchange is obtained through the inner surface 113 of the insulating body 110. This allows to reduce the weight of the electrical conductor 130 and to increase the flexibility of the power cable 100. In addition, heat exchange may also happen through the outer surface of the insulating body 110 with ambient air surrounding the power cable 100.

The coolant 180 may include any type of coolant, such as a water-based coolant including, for example, glycol and/or alcohol. Alternatively, or in combination, the coolant may include a dielectric fluid such as FLUORINERT FC-43 or NOVEC 7500, both distributed by the 3M Company of Saint Paul, Minnesota, or a transformer oil.

All the unique features of the above-described figures and disclosure may be combined. For example, any mounting portion may be combined with any curved or tubular portion of an electrical connector. The mounting portions may have any form configured to connection of an electrical terminal. For example, they may be non-planar and/or may include one or more shafts or other fixing means. The power cable may have any electrical conductor. The electrical conductor may be secured in a tubular portion of an electrical connector by any fixing means such as screwing, riveting, braising, gluing, snap-fitting or welding.

The fluid connectors may be of any type known in the art and are not limited to the fluid connectors visible in the figures. The above figures generally describe examples of the connection of an end portion of the power cable but the opposite end portion of the power cable may be connected according to any of the above examples.

While this invention has been described in terms of the preferred embodiments thereof, it is not intended to be so limited, but rather only to the extent set forth in the claims that follow. For example, the above-described embodiments (and/or aspects thereof) may be used in combination with each other. In addition, many modifications may be made to configure a particular situation or material to the teachings of the invention without departing from its scope. Dimensions, types of materials, orientations of the various components, and the number and positions of the various components described herein are intended to define parameters of certain embodiments and are by no means limiting and are merely prototypical embodiments.

Many other embodiments and modifications within the spirit and scope of the claims will be apparent to those of skill in the art upon reviewing the above description. The scope of the invention should, therefore, be determined with reference to the following claims, along with the full scope of equivalents to which such claims are entitled.

As used herein, 'one or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses all possible combinations of one or more of the associated listed items. It will be further understood that the terms "includes," "including," "includes," and/or "including," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Additionally, while terms of ordinance or orientation may be used herein these elements should not be limited by these terms. All terms of ordinance or orientation, unless stated otherwise, are used for purposes distinguishing one element from another, and do not denote any order of arrangement, order of operations, direction or orientation unless stated otherwise.

The invention claimed is:

1. A high voltage power cable, comprising:
   an insulating body defining an interior channel configured to receive and retain a coolant within; and
   an electrical conductor disposed within the insulating body, wherein the electrical conductor is arranged within the insulating body closer to an outer wall of the insulating body and further from the interior channel, thereby allowing heat exchange with the environment external to the high voltage power cable and with the interior channel.

2. The high voltage power cable of claim 1, wherein the insulating body is overmolded on the electrical conductor.

3. The high voltage power cable of claim 1, wherein the insulating body includes a peripheral wall around the interior channel and wherein electrical conductor is located in a central portion of the peripheral wall.

4. The high voltage power cable of claim 1, wherein the insulating body is of a tubular or cylindrical form.

5. The high voltage power cable of claim 1, wherein the electrical conductor includes an electrical conductor layer.

6. The high voltage power cable of claim 5, wherein the electrical conductor layer is arranged around the interior channel.

7. The high voltage power cable of claim 5, including at least two electrical conductor layers.

8. The high voltage power cable of claim 1, wherein the electrical conductor has a first end contact surface and a second end contact surface including exposed outer surfaces of the electrical conductor for coupling the electrical conductor to respective electrical terminals.

9. The high voltage power cable of claim 1, wherein the electrical conductor is comprised of a metal material, the metal material selected from a list consisting of copper, a copper alloy, aluminum, and an aluminum alloy.

10. The high voltage power cable of claim 1, wherein the electrical conductor is configured to transmit a voltage of at least 1000 VAC RMS and/or at least 1500 VDC.

11. The high voltage power cable of claim 1, wherein the electrical conductor has a cross-section area of at least 10 $mm^2$.

12. The high voltage power cable of claim 11, wherein the electrical conductor has a cross-section area of at least 25 $mm^2$.

13. The high voltage power cable of claim 12, wherein the electrical conductor has a cross-section area of at least 35 $mm^2$.

14. The high voltage power cable of claim 1, wherein the insulating body has a thickness of at least 0.5 mm.

15. The high voltage power cable of claim 14, wherein the insulating body has a thickness of at least 1.0 mm.

16. The high voltage power cable of claim 1, the insulating body including at least one shielding layer around the electrical conductor.

17. The high voltage power cable of claim 1, including an overlay around the insulating body, the overlay including at least one shielding layer.

18. The high voltage power cable of claim 1, wherein the insulating body is formed of a polymeric material.

19. The high voltage power cable of claim 18, wherein the polymeric material is selected from the list consisting of cross-linked polyethylene (XLPE), polypropylene (PP), ethylene tetrafluoroethylene (ETFE), and fluorinated ethylene propylene (FEP).

\* \* \* \* \*